May 5, 1936.  J. B. TIEDEMANN  2,039,755
MACHINE AND WORK POSITIONING MECHANISM
Filed Jan. 31, 1935  4 Sheets-Sheet 1

INVENTOR.
Julius B. Tiedemann
BY
ATTORNEY.

May 5, 1936.  J. B. TIEDEMANN  2,039,755
MACHINE AND WORK POSITIONING MECHANISM
Filed Jan. 31, 1935  4 Sheets-Sheet 2
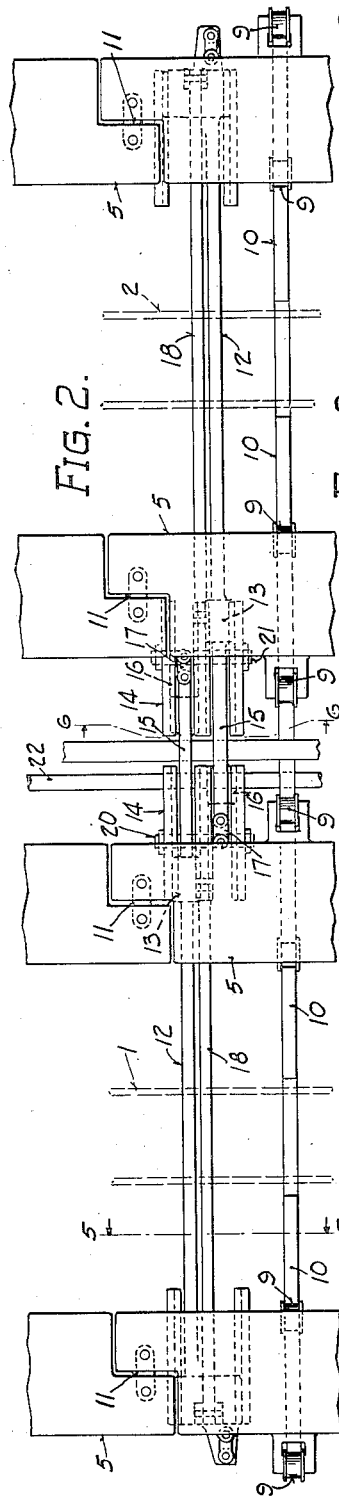
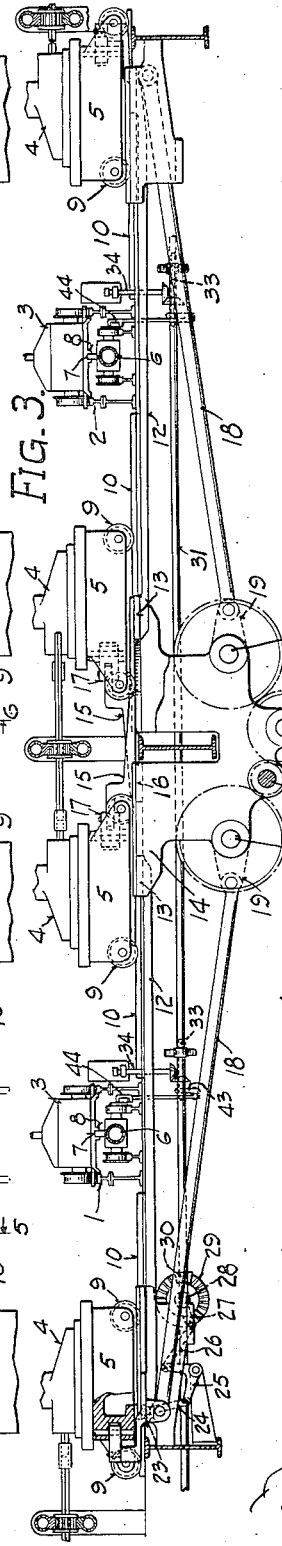
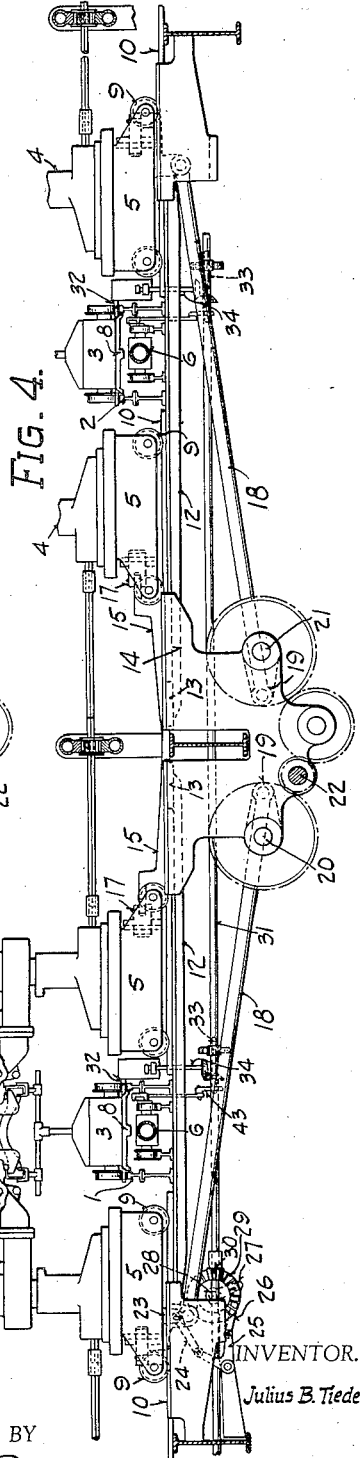
INVENTOR.
Julius B. Tiedemann
BY
ATTORNEY.

May 5, 1936.     J. B. TIEDEMANN     2,039,755
MACHINE AND WORK POSITIONING MECHANISM
Filed Jan. 31, 1935     4 Sheets-Sheet 3

INVENTOR.
Julius B. Tiedemann
BY
ATTORNEY.

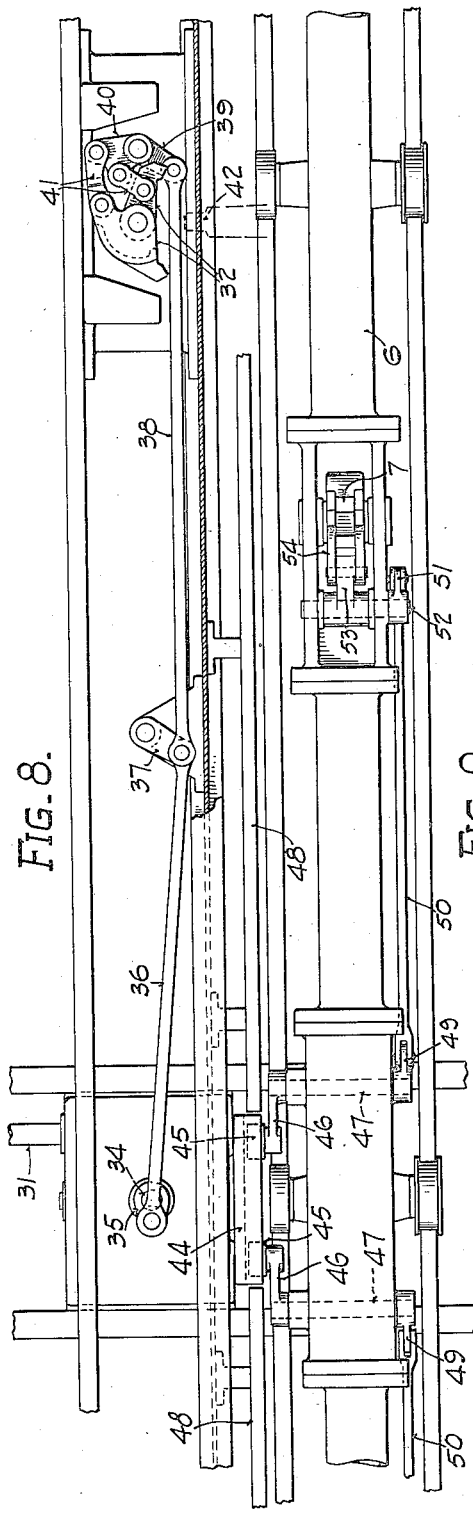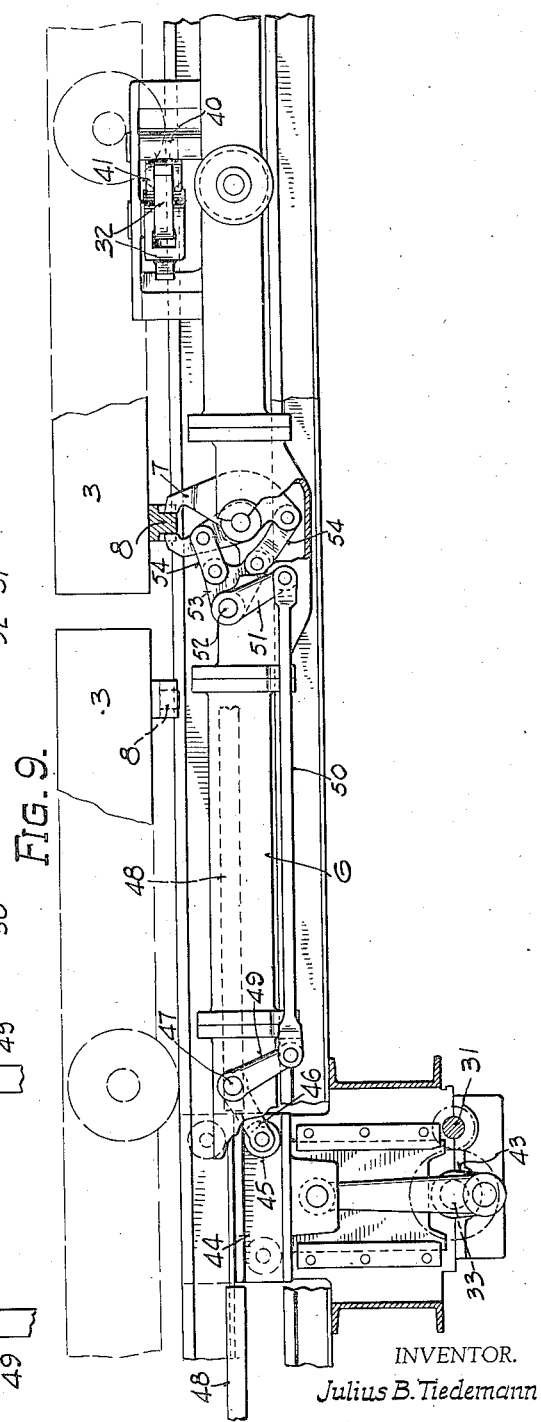

Patented May 5, 1936

2,039,755

UNITED STATES PATENT OFFICE 2,039,755

MACHINE AND WORK POSITIONING MECHANISM

Julius B. Tiedemann, Milwaukee, Wis., assignor to A. O. Smith Corporation, Milwaukee, Wis., a corporation of New York Application January 31, 1935, Serial No. 4,404

13 Claims. (Cl. 29—33)

This invention relates to machine and work positioning mechanism and has been particularly applied to the positioning of riveting and forming machines adjacent a conveyor in the manufacture of automobile frames. The invention, however, may be applied to various uses.

The subject matter has been utilized in connection with the inventions set forth in U. S. Letters Patent No. 1,397,020, granted November 15, 1921, to R. S. Smith, for Method of and apparatus for forming and assembling metal elements, and U. S. Letters Patent No. 1,408,156, granted February 28, 1922, to B. T. Andren, for Movable platform for positioning special machines and tools, and constitutes an improvement over the disclosure of U. S. Letters Patent No. 1,491,182, granted April 22, 1924, to B. T. Andren, for Mechanism for positioning and actuating special machines and tools.

The object of the invention is to provide for more accurate and speedy positioning of machines at the various work stations along a conveyor line.

Other objects are to eliminate vibration and to reduce the amount of power required for driving the machinery, thereby increasing its efficiency.

The preferred embodiment is illustrated in the accompanying drawings in which:

Fig. 2 is an enlarged top plan view of one of the machine positioning elements;

Fig. 3 is an end elevation of the mechanism shown in Fig. 2;

Fig. 4 is a view similar to Fig. 3 showing the mechanism in the opposite position in the cycle of operation;

Fig. 8 is a top plan view of the conveyor drive tube showing the mechanism for attaching to the trucks; and Fig. 9 is a side elevation of the mechanism shown in Fig. 8.

Figure 1:
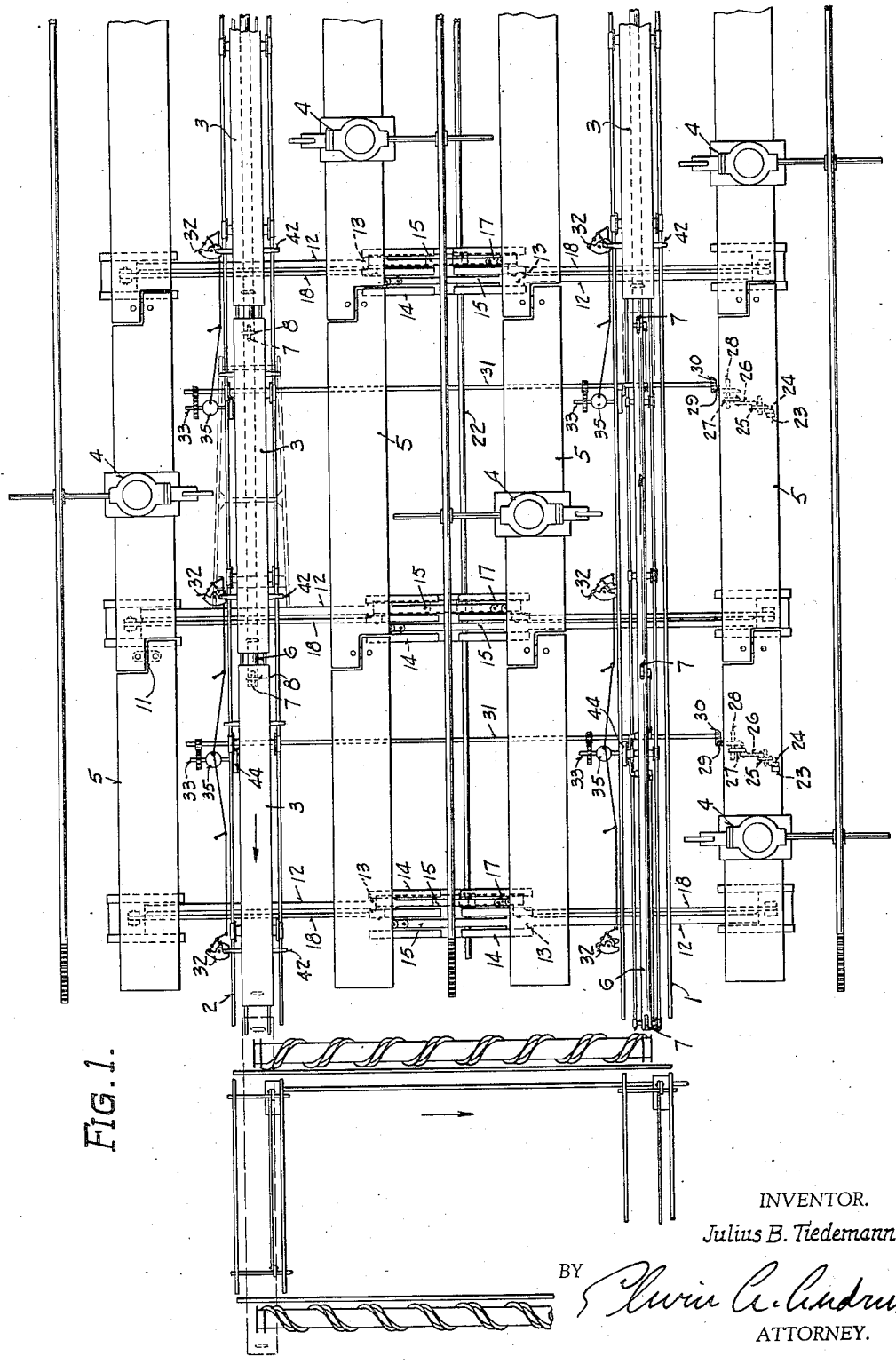
Figure 1 is a schematic top plan view of one end of the frame assembling plant illustrating the application of the invention thereto.
Figure 5:
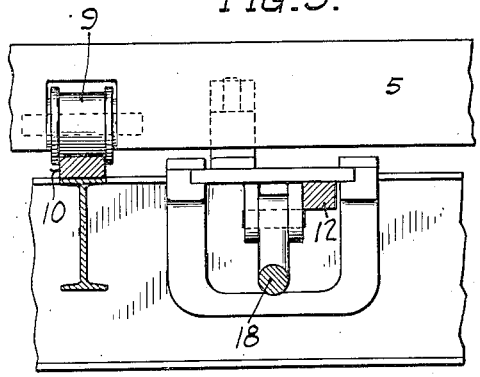
Fig. 5 is a section on line 5—5 of Fig. 2.
Figure 6:
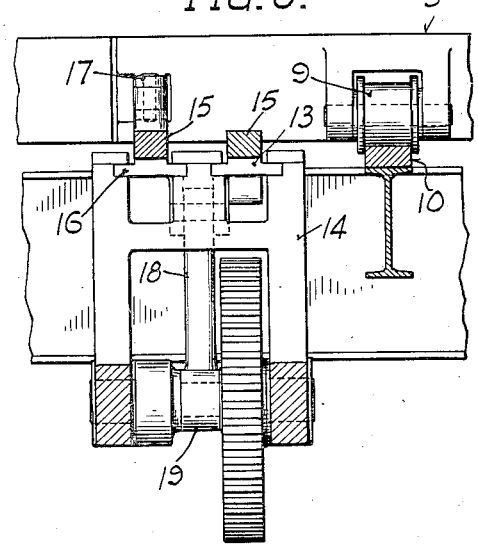
Fig. 6 is a section on line 6—6 of Fig. 2.

The machine is illustrated as including two parallel conveyor lines 1 and 2 along which conveyor trucks 3 are propelled intermittently to successive work stations at which metal working machines 4 such as riveting machines are mounted on laterally movable machine platforms 5 on opposite sides of the conveyor lines. It will be understood, however, that the invention is applicable to a single conveyor line machine or to any suitable number of conveyor lines.

The trucks 3 are advanced along the conveyor tracks 1 and 2 by means of reciprocating drive tubes 6 having jaws 7 which grip depending lugs 8 on the trucks, the actuation of the jaws being more fully described hereinafter. When the trucks 3 are at rest at the different work stations, the jaws 7 are released, and the tubes 6 returned to starting position ready to advance the trucks to the next respective work stations.

While the trucks dwell at the various work stations the machine platforms 5 are moved laterally to bring the various machines 4 into work performing position; the machines 4 are then operated, and finally the machine platforms 5 are retracted to withdraw the machines 4 from interference with the next advance of the trucks 3 along the conveyor lines. Means are also provided for accurately positioning the trucks 3 relative to the machines 4 during approach and operation of the machines. The various operations and movements are effected from a single power source in synchronism as more fully described in the patents referred to above, and in applicant's co-pending application Serial No. 4,403, filed January 31, 1935.

The machine platforms 5 are supported by rollers 9 upon transversely extending tracks 10 on opposite sides of the conveyor lines 1 and 2. Each work station on the conveyor lines is provided with two machine platforms 5, one on either side of the respective conveyor line. The sections of the platforms 5 on each side of a conveyor line are arranged in alignment end to end and are connected by laterally extending links 11 to move substantially simultaneously toward or away from the work.

The movement of the platforms 5 is effected by means linked thereto adjacent one end of each section. A single such means is illustrated in Figures 2 to 6. For this purpose the platforms may be grouped in pairs, those on the left-hand sides of the respective conveyor lines 1 and 2 constituting one pair and those on the right-hand side of the respective conveyor lines 1 and 2 constituting the other pair. The platforms of one pair always move simultaneously in the same direction but in an opposite direction to those of the other pair in order that all of the platforms will approach the work positions simultaneously and will be retracted similarly.

The corresponding sections of the platforms in the left-hand pair are connected together and those of the right-hand pair are similarly connected. This connection may be effected in several ways, that illustrated, constituting beams 12 pivoted to the outer platform of the pairs and having their adjacent inner ends connected to cross heads 13 sliding in stationary guideways 14. The cross heads 13 are connected through links 15, which form extensions of beams 12, to a second set of cross heads 16 which in turn are connected by short links 17 to the inner platform of the respective pairs.

The beams 12, cross heads 14 and 16, and links 15 and 17 of the respective pairs are offset from each other so as not to interfere.

The respective pairs of platforms 5 are driven by links 18 connected at their outer ends to the outer platforms of the pairs and at their inner ends to cranks 19 fixed to the separate shafts 20 and 21, shafts 20 driving the crank 19 and link 18 for operating the left-hand pair and shaft 21 driving the crank 19 and link 18 for operating the right-hand pair.

The shafts 20 and 21 are rotated from a common driveshaft 22 in reciprocative manner and in opposite directions to effect movement of the respective pairs of platforms in opposite directions to predetermined positions.

The length of the cranks 19 determine the distance of movement of the platforms 5 and the cranks 19 are disposed to be near dead center at the ends of movement of the platforms so as to obtain smooth acceleration and retardation of movement of the platforms. By centering the drive of cranks 19 in a gear box as shown, there is very little stress put upon the framework of the plant and the masses moving in opposite directions tend to balance each other.

The machines 4 are definitely positioned longitudinally of the plant by means of the transverse tracks 10 which support the platforms 5, but in order to insure accurate positioning relative to the work on the trucks 3, it is necessary to provide a means for indexing and holding the trucks in accurate position at the various work stations. The present invention provides a very simple indexing means operated by the movement of the platforms 5, and in which very little power is consumed in operation.

One of the platforms 5 is provided with depending lugs 23 each of which is connected by means of a link 24 to one arm of a bell crank 25, the other arm of which is connected by means of a second link 26 to a crank 27. The crank 27 is secured to a shaft 28 extending parallel to the conveyor lines 1 and 2, and a bevel gear 29 attached to the shaft 28, meshes with a complementary bevel pinion 30 secured to a transverse shaft 31 for actuating the driving jaws 7 and indexing jaws 32.

Figure 7:
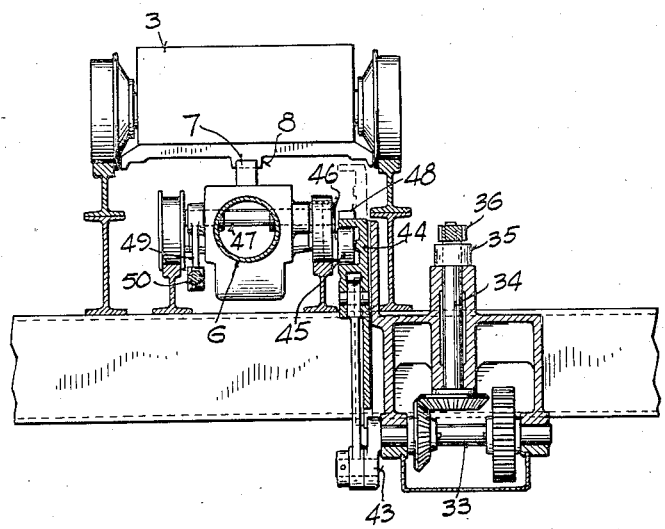
Fig. 7 is a transverse section showing the mechanism for accurately positioning the conveyor trucks relative to the machines.

The shafts 31 are geared to operate short horizontal crank shafts 33 beneath each conveyor line. Each shaft 33 is, in turn, geared to operate a vertical shaft 34 which has a crank 35 secured to its upper end; see Fig. 7. The crank 35 is connected by means of a link 36, a bell crank lever 37, and a second link 38 to a crank 39. The crank 39 operates a bell crank lever 40 which is connected by links 41 at its opposite extremities to the pivoted indexing jaws 32 which operate to grip a laterally extending lug 42 on the respective conveyor trucks 3 to positively index the latter at each station.

In operation, when the platforms 5 approach the conveyor lines 1 and 2 for work performing operations motion is transmitted through the various cranks, levers, and shafts 24 to 31 and 33 to 41 to close the jaws 32 upon the lugs 42 and thereby index the several trucks 3 and the work thereon relative to the machines 4. Similarly, when the platforms 5 are returned away from the conveyor lines 1 and 2, the same mechanism opens the jaws 32 and releases the lugs 42 to permit the next advance of the trucks.

In order to insure proper engagement and disengagement of the driving tube 6 with the several trucks in timed relation to the work performing operations, the movement of the platforms 5 is adapted to also operate the driving jaws 7 to alternately grip and release the lugs 8 on the several trucks. This is accomplished through a crank 43 on the end of shaft 33. The crank 43 effects vertical reciprocation of a slide 44 of channel shaped cross section extending horizontally and parallel to the line of travel of the trucks 3. Riding in the channel 44 is a roller 45 on the end of a crank arm 46 secured to a short shaft 47 on the driving tube 6. Between the several slides 44 which are located at each work station are guides 48 adapted to receive the rollers 45 during movement of the tube 6, each roller 45 riding either above or below the respective guide 48 depending upon the location of the roller by the reciprocating slide 44 just prior to the particular movement of the tube 6.

The shaft 47 is connected by means of crank 49, link 50 and crank 51 to a short shaft 52 having a bell crank lever 53 thereon. The opposite ends of the bell crank lever 53 are connected by links 54 to the opposite elements of the jaws 7 to actuate the same. When the rollers 45 ride above the guides 48, the jaws 7 are open, permitting the tubes 6 to be returned to starting position while leaving the trucks 3 at the respective work stations. When the rollers 45 ride below the guides 48, the jaws 7 are closed upon lugs 8 and the forward movement of tubes 6 effects an advance of each truck 3 to the next succeeding work station. For this purpose it is understood that the number of jaws 7 and the spacing thereof along tubes 6 will depend upon the number of trucks to be advanced and the length and spacing of the trucks. The driving jaws 7 are operated by the movement of platforms 5, approach of the latter to the conveyor lines opening the jaws and releasing lugs 8, and return movement of the platforms effecting closing of the jaws 7 upon lugs 8. Thus, the jaws 7 operate oppositely to the indexing jaws 32 to insure proper travel of the work to the machines 4 and proper location of the work relative to the machines 4 in timed sequence to the movement of the machines to working position and the operation of the machines.

The conveyor, the machine positioning mechanism and the machines are operated from a single common source of power, thereby obtaining proper coordination of the various operations in synchronism.

I claim:

1. In a machine of the class described, a conveyor line having a work station, work performing machines on opposite sides of said line and spaced therefrom, and means for moving said machines simultaneously toward said conveyor line into working position and for similarly retracting said machines, said last-named means comprising a pair of cranks intermittently rotated toward and away from each other and means connecting said cranks to the respective machines to effect the positioning thereof.

2. In a machine of the class described, a conveyor line having a work station, work performing machines on opposite sides of said line and spaced therefrom, and means for moving said machines simultaneously toward said conveyor line into working position and for similarly retracting said machines, said last-named means comprising a pair of cranks intermittently rotated toward and away from each other and means connecting said cranks to the respective machines to effect the positioning thereof, said cranks being operated in synchronism with said conveyor line to effect work performing operations upon successively presented work.

3. In a machine of the class described, two parallel conveyor lines having a plurality of work stations therealong, a plurality of machines disposed on opposite sides of each of said conveyor lines for performing work at the several stations, a pair of cranks intermittently rotated in opposite directions, means for connecting said cranks to the groups of machines disposed at the outside of said conveyor lines for moving said machines toward and away from said lines, and means connecting said outer groups of machines to the respective inner groups of machines disposed between said conveyor lines to effect similar movement of said inner groups simultaneously with the said outer groups.

4. In a machine of the class described, a conveyor line having a plurality of work conveying trucks adapted to be intermittently advanced and disposed at successive work stations therealong, work performing machines disposed on opposite sides of said line and spaced therefrom at the several stations, means for moving said machines simultaneously toward said conveyor line into working position and for similarly retracting said machines, said means comprising a pair of cranks intermittently rotated in opposite directions and means connecting said cranks to the respective machines to effect the lateral positioning thereof relative to said conveyor line, and means actuated by said lateral movement of said machines for indexing said work conveying trucks longitudinally relative to said machines.

5. In a machine of the class described, two parallel conveyor lines having a plurality of work stations therealong, a plurality of machines disposed on opposite sides of each of said conveyor lines for performing work at the several stations, means for moving the machines disposed at the outside of said conveyor lines toward and away from said lines, and means connecting said outer groups of machines to the respective inner groups of machines disposed between said conveyor lines to effect similar movement of said inner groups simultaneously with said outer groups.

6. In a machine of the class described, a conveyor line having a plurality of work conveying trucks disposed on tracks and adapted to be intermittently advanced and disposed at successive work stations therealong, work performing machines disposed on opposite sides of said line and spaced therefrom at the several stations, means for moving said machines simultaneously toward said conveyor line into working position and for similarly retracting said machines, and means actuated by said lateral movement of said machines for indexing said work conveying trucks longitudinally on said tracks relative to said machines.

7. In a machine of the class described, a truck movable along a definite path, means for intermittently advancing the truck along the path, machines disposed along and movable toward and away from the path, a pair of clamping jaws disposed adjacent each machine for holding the trucks at predetermined positions relative to the respective machines during intervals when the trucks are not in motion, and a positive connection between the machines and the clamping jaws to cause clamping engagement of the latter with the truck upon movement of each machine toward the truck and release of the jaws when each machine is moved away from the truck.

8. In a machine of the class described, a plurality of trucks movable along a definite path, a platform disposed adjacent to and movable toward and away from the path, a plurality of machines disposed on the platform, means for intermittently advancing the trucks to successive machines, a pair of clamping jaws disposed adjacent each machine for locking the trucks at the respective machines during intervals between periods of movement of the trucks, and a positive connection between the platform and the clamping jaws to cause clamping engagement of the latter with the trucks upon movement of the platform toward the trucks and release of the jaws when the platform is moved away from the trucks.

9. In a machine of the class described, a plurality of trucks movable along a definite path, a machine disposed adjacent to and movable toward and away from the path, means for intermittently advancing the trucks along the path to position the trucks successively adjacent the machine, clamping jaws disposed adjacent the machine for locking successive trucks at the machine during intervals between periods of movement of the trucks, and a positive connection including cranks between the machine and the clamping jaws to cause clamping engagement of the latter with the trucks upon final movement of the machine toward the trucks and release of the jaws upon initial movement of the machine away from the trucks.

10. In a machine of the class described, a plurality of trucks movable along a definite path, platforms disposed on opposite sides of the path and movable toward and away from the path, a plurality of machines disposed on each of the platforms, means for intermittently advancing the trucks in unison to successive machines, clamping jaws disposed adjacent each machine for locking the trucks at the respective machines during intervals between periods of movement of the trucks, and a positive connection including cranks between one of the platforms and all of the clamping jaws to cause clamping engagement of the latter with the trucks upon final movement of the platforms toward the trucks and release of the jaws upon initial movement of the platforms away from the trucks.

11. In a machine of the class described, a truck movable along a definite path, machines disposed along and movable toward and away from the path, a reciprocable driving means adjacent the path, clamping jaws on the driving means for coupling the truck to the driving means during movement thereof in one direction only to intermittently advance the truck to successive machines, clamping jaws disposed adjacent each machine for locking the truck at the respective machines during intervals between periods of movement of the trucks, and a positive connection between the machines and the jaws to cause clamping engagement of the locking jaws with the truck and simultaneous release of the coupling jaws upon movement of each machine toward the truck and release of the locking jaws and simultaneous clamping engagement of the coupling jaws upon movement of each machine away from the truck.

12. In a machine of the class described, a conveyor, a reciprocatory driving means disposed adjacent to the conveyor disposed on tracks, means for coupling the conveyor to the driving means during movement thereof in one direction only, means for holding the conveyor in a predetermined position on said tracks during the return stroke of the driving means, a machine associated with the conveyor, a drive mechanism for moving the machine toward and away from the conveyor, and means connecting the machine with the coupling and holding means to cause operation of the coupling and holding means during movement of the machine toward and away from the conveyor.

13. In a machine of the class described, a conveyor line, a plurality of conveyor trucks movable along said line, a reciprocatory driving means disposed adjacent to the trucks, clamping jaws for coupling the trucks to the driving means during movement thereof in one direction only, doweling jaws for maintaining the trucks in predetermined positions during the return stroke of the driving means, a platform located laterally adjacent the conveyor, a plurality of machines disposed on the platform, a drive mechanism for moving the platform toward and away from the conveyor, and means connecting the platform with the clamping and doweling jaws to cause operation of the jaws during movement of the platform toward and away from the conveyor.

JULIUS B. TIEDEMANN.